United States Patent

Naderhoff et al.

(12) United States Patent
(10) Patent No.: US 6,369,189 B1
(45) Date of Patent: Apr. 9, 2002

(54) HINDERED AMINE ADDUCTS FOR POLYUREA SYSTEMS

(75) Inventors: Bryan Naderhoff, Durham; Ling Tan; Jeffrey H. Danneman, both of Raleigh, all of NC (US)

(73) Assignee: Reichhold, Inc., Durham, NC (US)

( * ) Notice: Subject to any disclaimer, the term of this patent is extended or adjusted under 35 U.S.C. 154(b) by 0 days.

(21) Appl. No.: 09/456,223

(22) Filed: Dec. 7, 1999

(51) Int. Cl.$^7$ .................... C08G 18/10; C08G 18/32; C08G 18/38; C08G 18/46; C08G 18/50

(52) U.S. Cl. .................... 528/49; 427/180; 427/202; 427/385.5; 528/59; 528/60; 528/61; 528/68; 528/76; 528/77; 528/84

(58) Field of Search ..................... 528/49, 59, 60, 528/61, 68, 76, 77, 84; 427/180, 202, 385.5

(56) References Cited

U.S. PATENT DOCUMENTS

| | | | |
|---|---|---|---|
| 3,728,387 A | * 4/1973 | Freis et al. | 564/147 |
| 3,963,771 A | * 6/1976 | Robson et al. | 560/171 |
| 4,045,416 A | * 8/1977 | Robson et al. | 528/392 |
| 4,088,633 A | 5/1978 | Gurney | 528/99 |
| 4,105,808 A | 8/1978 | McKenzie | 427/137 |
| 4,185,132 A | 1/1980 | Gurney | 427/137 |
| 4,281,089 A | * 7/1981 | Pazos | 525/456 |
| 4,408,008 A | 10/1983 | Markuschd | 524/591 |
| 4,742,147 A | * 5/1988 | Nichols | 528/75 |
| 5,077,117 A | 12/1991 | Harper et al. | 428/143 |
| 5,109,098 A | 4/1992 | Harris et al. | 528/78 |
| 5,126,170 A | 6/1992 | Zwiener et al. | 427/385.5 |
| 5,171,818 A | 12/1992 | Wilson | 528/59 |
| 5,218,005 A | 6/1993 | Zimmerman et al. | 521/58 |
| 5,385,684 A | 1/1995 | Gutierrez et al. | 252/47.5 |
| 5,428,124 A | 6/1995 | Slack et al. | 528/60 |
| 5,442,034 A | 8/1995 | Primeaux, II | 528/60 |
| 5,464,920 A | 11/1995 | Mafoti et al. | 528/60 |
| 5,472,737 A | 12/1995 | Anders | 427/137 |
| 5,472,999 A | 12/1995 | Kudoh et al. | 523/409 |
| 5,502,147 A | 3/1996 | Nodelman et al. | 528/49 |
| 5,510,445 A | 4/1996 | Haider et al. | 528/60 |
| 5,516,872 A | 5/1996 | Mafote et al. | 528/60 |
| 5,516,873 A | 5/1996 | Hicks et al. | 528/60 |
| 5,559,204 A | 9/1996 | Squiller et al. | 528/84 |
| 5,605,953 A | 2/1997 | Esser | 524/522 |
| 5,609,965 A | 3/1997 | Esser | 428/522 |
| 5,616,677 A | 4/1997 | Primeaux, II et al. | 528/66 |
| 5,665,793 A | 9/1997 | Anders | 523/172 |
| 5,709,908 A | 1/1998 | Gurney | 427/137 |
| 5,770,674 A | 6/1998 | Cageao et al. | 528/73 |
| 5,853,615 A | 12/1998 | Suhr | 252/301.21 |
| 5,929,272 A | 7/1999 | Epple et al. | 560/253 |
| 5,939,514 A | 8/1999 | Brown et al. | 528/229 |
| 6,013,755 A | 1/2000 | Primeaux, II et al. | 528/68 |
| 6,015,871 A | 1/2000 | Jamasbi et al. | 528/48 |
| 6,027,764 A | 2/2000 | Gurney | 427/137 |
| 6,048,944 A | 4/2000 | Epple et al. | 523/375 |
| 6,057,415 A | 5/2000 | Roesler et al. | 528/28 |
| 6,166,106 A | 12/2000 | Purgett et al. | 523/172 |

FOREIGN PATENT DOCUMENTS

DE 197 01 835 A1 7/1998

OTHER PUBLICATIONS

"Polyurea Spray Technology Information brochure," Texaco Chemical Company (1989).

D.J. Primeaux, II, "100% Solids Aliphatic Spray Polyurea Elastomer Systems," *Polyurethanes World Congress 1991* Proceedings of the SPI/ISOPA 473–476 (Sep. 1991).

* cited by examiner

*Primary Examiner*—Rabon Sergent
(74) *Attorney, Agent, or Firm*—Myers Bigel Sibley & Sajovec, P.A.

(57) ABSTRACT

A polymeric composition may include an isocyanate component and an amine component, which includes:

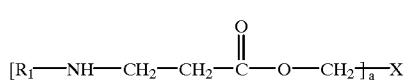

where $R_1$ represents a hydrocarbon radical, X represents an organic group, and a is an integer. The polymeric composition may further include:

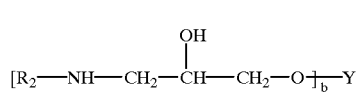

where $R_2$ represents a hydrocarbon radical; Y represents an organic group; and b is an integer. Methods of forming such polymeric and amine compositions and methods of applying such polymeric systems are also provided.

11 Claims, No Drawings

HINDERED AMINE ADDUCTS FOR POLYUREA SYSTEMS

FIELD OF THE INVENTION

The invention relates to polyurea polymers, particularly polyurea polymers containing hindered amine adducts, and more particularly polyurea polymers containing hindered amine adducts suitable for coatings.

BACKGROUND OF THE INVENTION

Synthetic polymers have an enormous impact on our day-to-day lives. Polymers have a variety of uses ranging from films and foams to molded plastics and adhesives, just to name a few. One of the most popular uses for polymer compositions is as a coating material. Both one- and two-component coating compositions, particularly polyurethane and polyurea based coating compositions, are known.

One-component coating compositions typically contain fully reacted polyurethanes as the binder. One of the many advantages of one-component coating systems is that they provide good adhesion to a substrate. This adhesive property exists because the one-component systems have relatively long dry times that allow for sufficient wetting of the substrate. While the adhesive properties are advantageous, long dry times, however, may make one-component coatings unsuitable for applications that require rapid dry times, for example pavement marking. Additionally, these coatings require large amounts of solvents to reduce their viscosity. There is a growing concern that solvents, particularly the organic solvents often used in one-component systems, may pose severe environmental and occupational safety hazards. Furthermore, one-component systems suffer from poor wear properties because they do not form highly crosslinked coatings.

Two-component compositions often contain a polyisocyanate component in one container and an isocyanate-reactive component in a second container. One such two-component system is a polyurea system. An exemplary polyurea system is disclosed in U.S. Pat. No. 5,218,005 to Zimmerman et al. Zimmerman et al. propose a polyurea system containing polyisocyanate, polyoxyalkylene polyamine, and polyamine adduct. U.S. Pat. No. 5,516,873 to Hicks et al. describes a polyurea system containing polyisocyanate, aldimine, and a compound containing an aspartate group. U.S. Pat. No. 5,559,204 to Squiller et al. discusses a polyurea coating system containing an aldimine/aspartate as the isocyanate-reactive component. U.S. Pat. No. 5,616,677 to Primeaux, II et al. proposes an aliphatic spray polyurea elastomer containing an aliphatic isocyanate, an amine-terminated polyoxyalkylene polyol, and a cycloaliphatic diamine chain extender.

Polyurea systems may provide highly crosslinked coatings that do not require large amounts of solvents. Extensive crosslinking may give these coatings excellent physical properties, including elongation and abrasion resistance. Additionally, the two components may react very quickly, with typical gel and dry times measured in seconds. Such rapid dry times appear to make these coatings suitable for applications like pavement marking. However, the reaction between the two components may actually occur too quickly. Due to the very rapid cure speed, polyurea systems must be applied with specialized application equipment, in which the two components are mixed immediately prior to the application. Even with the specialized equipment, the acceptance of polyurea systems has been low due to the application difficulties and performance problems. For instance, in coating applications polyureas have been reported to cure before the substrate is adequately wetted, yielding a film with poor adhesion.

SUMMARY OF THE INVENTION

It is therefore an object of the present invention to provide improved polymeric compositions that combine the exceptional properties of two-component polyurea systems, including rapid cure rate, with the excellent adhesive properties of one-component polyurethane systems.

It is another object of the present invention to provide an isocyanate-reactive component for use in such improved polymeric systems.

It is yet another object of the present invention to provide methods of forming such improved polymeric systems.

It is still another object of the present invention to provide methods of applying such improved polymeric systems to a substrate.

These and other objects, features and advantages are achieved by the various compositions and methods of the present invention. In one embodiment, a polymeric composition includes an isocyanate component and an amine component, which includes:

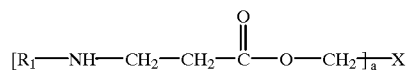

where $R_1$ represents a hydrocarbon radical, X represents an organic group, and a is an integer.

In another embodiment, a polymeric composition may include from about 5 to about 50 weight percent of an isocyanate component, and from about 50 to about 95 weight percent of an amine component including:

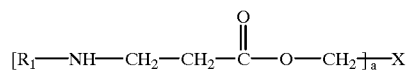

where $R_1$ represents a hydrocarbon radical, X represents an organic group, and a is an integer.

In yet another embodiment, an amine composition may include from about 30 to about 100 weight percent of a compound of Formula I,

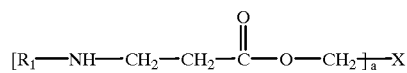

and from about 0 to about 70 weight percent of a compound of Formula II,

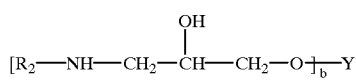

where $R_1$ and $R_2$ represent hydrocarbon radicals, X and Y represent organic groups, and a and b are both integers.

In further embodiments, methods of forming compositions of the present invention and of applying polymeric compositions of the present invention to substrates are provided.

By utilizing at least one hindered amine adduct as the amine component, polymeric compositions of the present invention combine the exceptional properties of a two-component polyurea system, including rapid cure time, with the excellent adhesive qualities of a one-component polyurethane system.

DETAILED DESCRIPTION OF THE PREFERRED EMBODIMENTS

The invention will now be described in greater detail with reference to the preferred embodiments which follow. It should be appreciated, however, that these embodiments are for illustrative purposes only, and are not meant to limit the invention as defined by the claims.

Polymeric compositions of the present invention may be formed by reacting an isocyanate component with an amine component. The isocyanate component used in the polymeric composition may be selected from isocyanates known in the art of polyurethane and polyurea chemistry including any of the aliphatic, cycloaliphatic, araliphatic or aromatic polyisocyanates. Examples of particularly suitable polyisocyanates include monomeric isocyanates, isocyanate functional prepolymers, isocyanate functional adducts, and mixtures thereof.

Examples of suitable monomeric isocyanates include 1,6 hexamethylene diisocyanate, 2,2,4-trimethyl-1,6-hexamethylene diisocyanate, isophorone diisocyanate, bis-(4-isocyanatocyclohexyl)-methane, 2,4-diphenyl-methane diisocyanate, 4,4'-diphenyl-methane diisocyanate, 1,1'-methylenebis(4-isocyantocyclohexane), trimethyl-hexamethylene diisocyanate, 1,4-tetramethylene diisocyanate, 1,12-dodecamethylene diisocyanate, 1-isocyanato-2-isocyanatomethyl cyclopentane, cyclohexane-1,3-diisocyanate, cyclohexane-1,4-diisocyanate, 2,4'-dicyclohexyl-methane diisocyanate, bis-(4-isocyanato-3-methylcyclohexyl)-methane, 1,3-bis-(isocyanatomethyl)-cyclohexane, 1,4bis-(isocyanatomethyl)-cyclohexane, α,α,α',α'-tetramethyl-3-xylylenediisocyanate, α,α,α',α'-tetramethyl-1,4-xylylenediisocyanate, 1,3-phenylene diisocyanate, 1,4-phenylene diisocyanate, 2,4-toluylene diisocyanate, 2,6-toluylene diisocyanate, 2,4-hexahydrotoluylene diisocyanate, 2,6-hexahydrotoluylene diisocyanate, 1-isocyanato-1-methyl-4(3)-isocyanatomethyl cyclohexane, and 1,5-diisocyanato naphthalene and mixtures thereof.

The isocyanate component may also be a monomeric isocyanate material that is chain extended by an alcohol to form an isocyanate functional prepolymer. Examples of suitable functional prepolymers can be prepared by reacting a monomeric isocyanate with a low molecular weight alcohol, to form for example prepolymers based on isophorone diisocyanate and trimethylol propane, prepolymers of isophorone diisocyanate and pentaerythritol, and prepolymers of isophorone diisocyanate and hexane diol. The alcohol may include, but is not limited to, diols, triols, and tetraols known to one skilled in the art. Examples of suitable alcohols include, but are not limited to, trimethylol ethane, trimethylol propane, glycerine, pentaerythritol, ethoxylated pentaerythritol, propoxylated pentaerythritol, ethylene glycol, diethylene glycol, and neopentyl glycol. The alcohol may also be in the form of low molecular weight hydroxyl functional acrylic resins, polyesters, or polyethers such as, but not limited to, polypropylene glycol and polyethylene glycol or a combination thereof.

Examples of suitable isocyanate functional adducts include polyisocyanates which contain isocyanurate groups, uretdione groups, biuret groups, allophanate groups, carbodiimide groups, or oxadiazinetrione groups, such as biuret of isophorone diisocyanate, isocyanurate trimer of isophorone diisocyanate, biuret of hexamethylene diisocyanate, and isocyanurate trimer of hexamethylene diisocycanate.

The most preferred polyisocyanate is the isocyanurate of 1,6 hexamethylene diisocyanate, having an NCO content by weight of preferably from about 10 to about 35%, more preferably from about 15 to about 30%, and most preferably from about 20 to about 25%.

The polymeric composition preferably comprises from about 5 to about 50 weight percent of the isocyanate component, and more preferably between about 25 to about 50 weight percent. These percentages are based on the weight of the reactive components.

The amine component typically comprises hindered amine adducts, represented by Formula I:

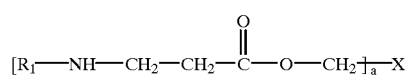

I wherein
R$_1$ is a hydrocarbon radical that may be represented by an alkyl group, an aryl-alkyl group, a hydroxy-alkyl group or an alkoxy-alkyl group. Exemplary hydrocarbons include t-butyl, t-octyl, C$_{12}$–C$_{14}$ and C$_{16}$–C$_{22}$ alkyls cyclohexane; X is an organic group having a valence of a. X may be propyl, ethyl, ethanol, methyl, methynol, 2-ethyl hexyl, lavryl hexane, tripropyl hexane, cyclohexane, isobornyl and the like, and is preferably propyl, methyl, methanol or isobornyl; and a represents integers having a value in the range of 1 to 20, more preferably 1 to 15, and most preferably 1 to 10. Hindered amine adducts of Formula I may be prepared by reacting a primary amine with an acrylate.

The primary amine may have the formula R—NH$_2$, where R is a hydrocarbon radical that may be represented by an alkyl group, an aryl-alkyl group, a hydroxy-alkyl group, or an alkoxy-alkyl group. Examples of suitable primary amines include butylamine, pentylamine, hexylamine, heptylamine, octylamine, nonylamine, decylamine and polyoxypropylene amine. R is preferably a tertiary alkyl group containing from about 4 to about 30 carbon atoms, such as t-butyl or t-octyl. Examples of preferable tertiary alkyl primary amines include, but are not limited to, tertiary-butyl primary amine, tertiary-octyl primary amine, 1-methyl-1-amino-cyclohexane, tertiary-tetradecyl primary amine, tertiary-hexadecyl primary amine, tertiary-octadecyl primary amine, tertiary-octacosanyl primary amine, and other primary amines containing higher tertiary C$_8$ to C$_{30}$ alkyl groups. Mixtures of tertiary alkyl primary amines may also be used. A suitable class of amines are commercially available under the Primene® tradename from Rohm and Haas Company of Philadelphia, Pa. Tertiary alkyl primary amines and methods for their preparation are known to those of ordinary skill in the art.

Suitable acrylates include those having the formula:

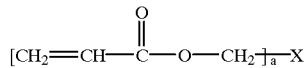

wherein X and a are as defined above. Suitable acrylate oligomers for preparing the hindered amine adducts of Formula I include tripropylene glycol diacrylate, trimethylolpropane triacrylate, isobornyl acrylate, pentaerythritol triacrylate, dipentaerythritol hexaacrylate, hexanediol diacrylate, cyclohexane-dimethanol diacrylate, tetraethylene glycol diacrylate, diacrylate of bisphenol A based epoxy, triacrylate of glycerol, ethoxylated trimethylolpropane triacrylate, acrylate of epoxidized soya oil, and urethane acrylates based on isophorone diisocyanate and petaerythritol triacrylate.

The amine component may also comprise hindered amine adducts, represented by Formula II:

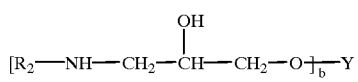

II wherein $R_2$ is a hydrocarbon radical that may be represented by an alkyl group, an aryl-alkyl group, a hydroxy-alkyl group or an alkoxy-alkyl group. Exemplary hydrocarbons include t-butyl, t-octyl, $C_{12}$ and $C_{14}$ and $C_{16}$–$C_{22}$ alkyls and cyclohexane; Y represents an organic group having a valence b and represents the hydrocarbon group obtained by removal of the glycidyl ether groups from epoxide resins based on bisphenol A, bisphenol F, tetrabromobisphenol A, phenol-formaldehyde condensates, hydrogenated bisphenol A, resocinol, sorbitol, etc. Preferably, Y represents the hydrocarbon group obtained by removal of the glycidyl ether groups from epoxide resins based on bidphenol A or bisphenol F; and b represents integers having a value in the range of 1 to 10, more preferably 1 to 8, and most preferably 1 to 6. Hindered amine adducts of Formula II may be prepared by reacting a primary amine with an epoxide or glycidyl ether.

The primary amine may be selected from the group described above, with tertiary alkyl primary amines preferable. Suitable epoxides or glycidyl ethers include those having the formula:

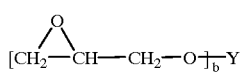

IV wherein Y and b are as described above. Suitable epoxide resins for preparing the hindered amine adducts are ones based on bisphenol A and bisphenol-F, such as, but not limited to, the diglycidyl ether of bisphenol A, diglycidyl ether of bisphenol-F, diglycidyl ether of tetrabromobisphenol A, epoxy novolacs based on phenol-formaldehyde condensates, epoxy novolacs based on phenol-cresol condensates, epoxy novolacs based on phenol-dicyclopentadiene condensates, diglycidyl ether of hydrogenated bisphenol A, diglycidyl ether of resorcinol, tetraglycidyl ether of sorbitol, tetra glycidyl ether of methylene dianiline or mixtures thereof; and glycidyl ethers of the following alcohols: 2-ethylhexanol, alcohols containing from 8 to 14 carbon atoms, cresol, p-tertiary butyl phenol, nonyl phenol, phenol, neopentyl glycol, 1,4-butanediol, cyclohexane dimethanol, propylene glycol, dibromo neopentyl glycol, trimethylol propane, trimethylol ethane, and n-butanol. Preferably, the epoxide has an average epoxide equivalent weight (EEW) of from about 120 to about 2000, and more preferably from about 140 to about 1000.

The amine component preferably comprises from 0 to about 100 weight percent of the hindered amine adduct represented by Formula I. The amine component more preferably comprises from about 30 to about 100 weight percent of the hindered amine adduct represented by Formula I and from about 0 to about 70 weight percent of the hindered amine adduct represented by Formula II.

The hindered amine adducts of Formulas I and II may be prepared in accordance with procedures that are known in the art. Typically, the amine adduct is formed by reacting an amine with the amine-reactive component. These reactions can be carried out in suitable reaction vessels at temperatures ranging from about 40 to 150° C. Preferably, a nitrogen or other inert gas cover may be used to exclude oxygen from the reaction. Where the amine component comprises hindered amine adducts represented in Formulas I and II, the adducts may be prepared separately and mixed after the individual synthesis of each adduct, or more conveniently, the hindered amine adducts can be prepared in a single reaction vessel either simultaneously or in sequence.

The polymeric composition preferably comprises from about 50 to about 95 weight percent of the amine component, and more preferably between about 50 to about 75 weight percent. These percentages are based on the weight of the reactive components.

Compositions of the present invention may also encompass other components that are conventionally employed in polymerizable systems. These components include, but are not limited to, accelerators, promoters, plasticizers, pigments, colorants, dyes, surfactants, thickeners, heat stabilizers, leveling agents, anti-cratering agents, fillers, sedimentation inhibitors, ultraviolet-light absorbers, and the like. Additives such as promoters, heat stabilizers, ultraviolet-light absorbers, etc. may be intimately dispersed in the reaction mixture and apparently thereby become an integral part of the polymer.

The polymeric composition of the invention may be utilized in conjunction with a paint composition, although other uses are contemplated within the scope of the invention. The paint composition may employ those components, additives, and the like which are known to the skilled artisan. Examples of materials that are typically employed in traffic paint compositions are set forth in U.S. Pat. No. 4,105,808 to McKenzie, the disclosure of which is incorporated herein by reference in its entirety. In particular, the paint composition comprises pigments such that the paint is visible after being applied to the pavement. Typically, white or yellow pigment is employed in the composition, preferably in an amount ranging from about 15 to about 25 parts based on the weight of the composition.

EXAMPLES

The following examples are presented to illustrate the invention and are not intended to limit the scope of the invention as defined by the claims. The examples show that the hindered amine adducts of the present invention may yield polyurea coatings with good adhesion, fast dry times, rapid hardness development, zero solvent content, and excellent durability to accelerated weathering. All amounts listed in the examples are by weight, unless otherwise specified. The following list of components will be referred to in the examples:

Amine 1 is a primary aliphatic amine with a tertiary alkyl group containing 12 to 14 carbon atoms. Amine 1 is commercially available as Primene® 81-R from Rohm and Haas Company of Philadelphia, Pa. Amine 1 has an amine equivalent weight of 185 to 200.

Amine 2 is a primary aliphatic amine with a tertiary alkyl group containing 8 carbon atoms. Amine 2 is commercially available as Primene® TOA from Rohm and Haas Company of Philadelphia, Pa. Amine 2 has an amine equivalent weight of 126 to 133.

Acrylate 1 is an acrylate oligomer which is trimethylol propane triacrylate. Acrylate 1 is commercially available as Ebecryl® TMTA from UCB Radcure of Smyrna, Ga. Acrylate 1 has a molecular weight of 300 and a theoretical acrylate equivalent weight of 100.

Acrylate 2 is an acrylate oligomer which is triproplyene glycol diacrylate. Acrylate 2 is commercially available as Ebecryl® TPGDA from UCB Radcure of Smyrna, Ga. Acrylate 2 has a molecular weight of 300 and a theoretical acrylate equivalent weight of 150.

Epoxide 1 is a solid diglycidyl ether of bisphenol A. Epoxide 1 is commercially available from Reichhold Inc. of Research Triangle Park, N.C. as EPOTUF® 37-001. Epoxide 1 has an average molecular weight of 1000 and an average epoxide equivalent weight of 500.

Epoxide 2 is a liquid diglycidyl ether of bisphenol A resin. Epoxide 2 is commercially available from Reichhold Inc. of Research Triangle Park, N.C. as EPOTUF® 37-140. Epoxide 2 has an average molecular weight of 370 and an average epoxide equivalent weight of 185.

Isocyanate 1 is the isocyanurate of 1,6 hexane diisocyanate. Isocyanate 1 is available as Desmodur® N-3300 available from Bayer Corp. of Pittsburgh, Pa. Isocyanate 1 has a NCO content of 21.6% and a NCO equivalent weight of 194.

Pigment 1 is a titanium dioxide pigment. Pigment 1 is commercially available as Tioxide® R-902 from Dupont of Wilmington, Del.

Example 1

Hindered Amine Adduct Based on Amine 1 and Acrylate 1

Into a 1 liter glass reaction vessel equipped with stirring, temperature controller, and nitrogen cover was charged 476 grams of Amine 1. The temperature was increased to 60–65° C. and a mixture of 224 grams of Acrylate 1, 7 grams of glacial acrylic acid, and 7 grams of triphenyl phosphite were added dropwise over 90 minutes. The temperature was held at 59–73° C. for 12 hours and then the temperature was increased to 90–95° C. for 7 hours. The analysis for hindered amine adduct is shown below:

| Viscosity, cps at 25° C. | 560 |
|---|---|
| Amine Value | 198.6 |
| Molecular Weight, Mw | 923 |
| Mn | 841 |
| Polydispersity, Mw/Mn | 1.1 |
| Amine Hydrogen Equivalent Weight | 282 |

Example 2

White Enamel Based on Hindered Amine from Example 1

A white mill base was prepared by dispersing 700 grams of Pigment 1 in 300 grams hindered amine adduct from Example 1. The mixture was high-speed dispersed until a pigment grind of 7 on the Hegmann scale was obtained. After grinding, a white enamel paint, Part A, was made by mixing 430 grams of the mill base and 570 grams of hindered amine adduct from Example 1.

A white polyurea coating was prepared by mixing 15 grams of the white enamel Part A with 6.72 grams of Isocyanate 1.20 mil drawdowns were prepared on steel panels. The polyurea coating was tested for gel time and dry times. Panels were allowed to cure for 7 days at room temperature and then tested for gloss retention and yellowing in QUV accelerated weathering test. The QUV conditions were 40° C. and cycling exposure to 4 hours of light from 340A bulbs followed by 4 hours of condensing humidity. Test results are shown in the table below.

| Gel Time | 42 seconds |
|---|---|
| Dry Times: | |
| No Track Time | 132 seconds |
| Through Dry | 574 seconds |
| Tack Free | 430 seconds |
| % Solvent | 0 |

| Accelerated Weathering (hours) | Gloss 60°/20° | Yellowness Index |
|---|---|---|
| Initial | 90/78 | 2.7 |
| 504 | 86/63 | 4.2 |
| 768 | 83/61 | 5.0 |
| 1008 | 83/54 | 6.5 |
| 1500 | 87/68 | 5.9 |

Example 3

Hindered Amine Adduct with Epoxide 1 Modification

Into a 1 liter reaction vessel equipped with stirring, temperature controller, and nitrogen cover was charged 190 grams of Amine 1, 260 grams of Amine 2, 200 grams of Acrylate 1, 120 grams of Acrylate 2, and 80 grams of Epoxide 1. The temperature was increased to 88° C. and held for approximately 10 hours at 86–99° C. The analysis of the hindered amine adduct is shown below:

| Viscosity, stokes at 25° C. | 23 |
|---|---|
| Amine Hydrogen Equivalent Weight | 283 |

Example 4

Hindered Amine Adduct with Epoxide 2 Modification

Into a 1 liter reaction vessel equipped with stirring, temperature controller, and nitrogen cover was charged 285 grams of Amine 1, 1.0 gram of triphenyl phosphite, and 300 grams of Acrylate 1. The temperature was increased to 103–107° C. over approximately 2 hours and then held for 5 hours. A sample labeled A was taken for analysis shown in the table below. 156 grams of Amine 2 was charged and the temperature was held at 103–107° C. for approximately 6 hours. A sample labeled B was taken for analysis shown in the table below. The temperature was dropped to 90–95° C. and 80 grams of Epoxide 2 was charged and the temperature was held at 86–95° C. for approximately 1 hour and then 20 grams of Epoxide 2 was charged and the temperature was held at 68–70° C. for 1 hour. A final sample labeled C was taken for analysis shown in the table below. The product was drained into containers for later use in hardness development experiments.

| Sample # | % Non-Volatiles | Viscosity, cps @ 50° C. | Residual Acrylate, eq/eq initial | % Unreacted Amine 1, by GC |
|---|---|---|---|---|
| A | 94.2 | 180 | 0.39 | 6.3 |
| B | 93.0 | NA | 0.07 | 6.1 |
| C | 96.2 | 370 | 0.07 | 4.7 |

Example 5

Hardness Development of Polyurea Based on Example 4

Sample C from Example 5 was tested for gel time, glass transition temperature, and hardness development. 16 grams of the hindered amine adduct from Example 4 were mixed with 9 grams of Isocyanate 1. The time required for gelation to occur was recorded and a small casting was poured in an aluminum dish for Shore D hardness and glass transition temperature analysis. Results are shown below:

| Resin | Gel Time, sec | Shore D Hardness after 30 min | after 1 hour | after 5 hours | after 24 hours | Glass Transition, ° C. |
|---|---|---|---|---|---|---|
| Example 4 Sample C | 55 | 66 | 70 | 76 | 79 | 41 |

Castings were also prepared for testing hardness development at temperatures ranging from 32–77° F. (0–25° C.). Shown below is the harness development over a 28-hour cure time:

| Cure Temperature, ° F. | Shore D Hardness after 1 hour | after 5 hours | after 28 hours |
|---|---|---|---|
| 32 | 65 | 74 | NA |
| 40 | 75 | 77 | 79 |
| 50 | 65 | 76 | 76 |
| 77 | 65 | 73 | 70 |

Example 6

Scale-up of Hindered Amine Adduct with Epoxide 2 Modification

Into a 10 gallon reaction vessel equipped with stirring, temperature control, and nitrogen cover was charged 8565 grams of Amine 1, 60.0 grams of triphenyl phosphite, 180 grams of p-nonyl phenol, and 12 grams of monomethyl ether of hydroquinone. Mixing and nitrogen flow was initiated and 9004 grams of Acrylate 1 was added. The temperature was increased to 103–107° C. over approximately 2 hours and then held for 4 hours. Cooling was applied to bring the temperature to 85° C. and 4560 grams of Amine 2 was then added. The batch was reheated to 103–107° C. over approximately 30 minutes and held for 150 minutes at which time 3011 grams of Epoxide 2 was added. Heating was discontinued and the reaction was stirred for 2 hours before shutting down for the day. The following day, the batch was heated to 80° C. and filtered through a medium paint filter into 5 gallon pails. The final analysis of the hindered amine adduct is shown below:

| Viscosity, centistokes at 25° C. | 5670 |
|---|---|
| Viscosity, centipoise at 50° C. | 520 |
| Amine Value | 176 |
| Amine Hydrogen Equivalent Weight | 319 |
| Gardner Color | 1 |
| % Non-volatiles | 96.6 |

Example 7

White Enamel Based on Hindered Amine from Example 6

A white mill base was prepared by dispersing 4400 grams Pigment 1 in 2933.4 grams hindered amine adduct from Example 6. The mixture was high-speed dispersed for approximately 20 minutes and a pigment grind of 6 on the Hegmann scale was obtained. After grinding, white enamel paint was made by mixing 6666.7 grams of the mill base with 13,333.3 grams of hindered amine adduct from Example 6.

Example 8

A white traffic stripe was applied to actual highway surfaces using the white enamel prepared in Example 7. The stripe was applied using walk behind striping equipment that was designed to apply a plural component paint system. The mixing ratio was 2 to 1 by volume of Part A to Part B. The Part A was the white enamel from Example 7 and the Part B was isocyanate 1. Both components were heated to the application temperature and spray applied using a high-pressure impingement mixing system commercially available from the Binks-Sames Company of Glendale Heights, Ill. The results of varying the application temperatures and mixing pressures are shown in the table below:

| Mixing Pressure, Psi | Resin Temperatures, ° F. | Results |
|---|---|---|
| 2500 | 130–135 | No cure on right side of stripe |
| 2800 | 140–145 | Good cure throughout stripe |

The coating was applied in a 4-inch wide stripe and reflective glass beads were dropped onto the coating to provide nighttinme visibility to the traffic stripe. A combination of large and small diameter glass beads were applied to the stripe. The large beads were Visabead® E16-1120 and the small beads were M247 AC-100, both commercially available from Potters Industries Inc. of Valley Forge, Pa. In order to obtain coating thicknesses and bead application rates, panels were coated with a 4 inch by 12 inch sample of (A) paint film only; (B) paint film and big beads; and (C) paint film and both beads. The actual weights and calculated film thicknesses and bead-drop weights are shown in the tables below:

| Paint and Bead Weight, grams per 4" × 12" film | | |
|---|---|---|
| A-Paint | B-Big Beads | C-Both Beads |
| 16.0 | 16.5 | 23.1 |

| Estimated Paint Thicknesses and Bead Drop Rates | | |
|---|---|---|
| Paint | Big Beads | Small Beads |
| 16 mils | 10 lbs/gal | 5 lbs/gal |

Test stripes were applied to concrete and asphalt sections of Highway 53 near Chippewa Falls, Wis. on Jul. 21, 1999. The coating hardened in approximately 30 seconds. After approximately 5 minutes cure time, the coating had developed good adhesion to the glass beads. A "No Track" test was run 1 minute after the coating was applied. In the No Track test, an automobile is driven over the test stripe after a specified cure time. A pass rating is given if the tire does not track any paint on the road or visibly damage the stripe. The stripe was given a pass rating on concrete and asphalt.

Example 9

Hindered Amine Adduct based on Amine 1, Acrylate 1, and Epoxide 2

Into a 1 liter glass reaction vessel equipped with stirring, temperature controller, and nitrogen cover was charged 316 grams of Amine 1, 148 grams of Amine 2, 1.4 grams of triphenyl phosphite, and 212.6 grams of Acrylate 1. The temperature was increased 95 C. over 1 hour and held at 93–97 C. for approximately 2½ hours, at which time 120 grams of Acrylate 1 and 40 grams of Epoxide 2 were added to the flask. The temperature was then increased to 103° C. and held at 102–107° C. for approximately 10 hours at which time the resin was cooled to 70° C. and filtered through a medium pain filter into a lined can. The analysis of the hindered amine adduct is shown in the table below:

| | |
|---|---|
| Viscosity, cps at 50° C. | 260 |
| Viscosity, stokes at 25° C. | 20.2 |
| Gardner Color | 2 |
| % Non-Volatiles | 94.5 |
| Amine Hydrogen Equivalent Weight | 303 |

Example 10

White Enamel Based on Hindered Amine from Example 9

A white mill base was prepared by as in Example 2, where Tioxide® R-902 titanium dioxide was high speed dispersed in the hindered amine adduct of Example 9 at a 20% by weight pigment level.

The white enamel was loaded into a part A side of a 2 component cartridge designed for static mixing. Isocyanate 1 was loaded into the Part B side of the cartridge. The cartridge had a mixing ratio of 2 parts A to 1 part B, by volume. When air pressure is applied to the static mixing gun, the two components travel through a static mixing tube. The system was dispensed onto concrete brick surfaces and 20 ml thickness coatings were prepared on the concrete surface using a drawdown bar. The adhesion of the coating to brick was tested under a variety of extreme conditions as shown in the table below. The excellent adhesion of the coating to concrete after water immersion and freeze-thaw conditions indicates that the coatings should have excellent performance for traffic stripe applications and other coating applications on concrete.

| Concrete Condition | Cure Conditions | Pneumatic Adhesion Tensile Testing Instrument, psi |
|---|---|---|
| Dry, RT | 16 hr at 90% relative humidity | 748 |
| Frozen, 0° C. | 2.5 days at 0° C. | 836 |
| Dry, RT | 16 hr water immersion | 800 |
| Dry, RT | 2.5 days water immersion | 794 |
| Dry, RT | Freeze-Thaw, 2 cycles of 8 hr water immersion & 16 hr at −18° C. | 682 |

Disclosed herein are typical preferred embodiments of the invention and, although specific terms are employed, they are used in a generic and descriptive sense only and not for purposes of limitation of the scope of the invention as defined by the claims.

That which is claimed:

1. A polymeric composition comprising:
   from about 5 to about 50 weight percent of the polymeric composition of an isocyanate component;
   from about 50 to about 95 weight percent of the polymeric composition of an amine component comprising:

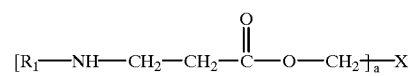

I where
   $R_1$ represents a hydrocarbon radical;
   X represents an organic group; and
   a is an integer from 1 to 20; and

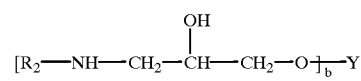

II where
   $R_2$ represents a hydrocarbon radical;
   Y represents an organic group; and
   b is an integer from 1 to 10 wherein greater than 0 to 70 percent of the amine component comprises Formula II.

2. The polymeric composition according to claim 1 wherein the isocyanate component is selected from the group consisting of monomeric isocyanates, isocyanate functional prepolymers, and isocyanate functional adducts.

3. The polymeric composition according to claim 1 wherein the isocyanate component is an isocyanurate of 1,6 hexamethylene diisocyanate.

4. The polymeric composition according to claim 1 wherein the isocyanate component has an NCO content of from about 10 weight percent to about 35 weight percent.

5. A method of forming a polyurea coating system comprising the steps of:

forming an amine component comprising a step of forming an amine compound of from about 50 to about 95 weight percent of the coating system of Formula I:

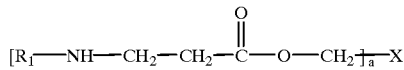

I where $R_1$ represents a hydrocarbon radical;

X represents an organic group; and a is an integer with a value in the range of 1 to 20 and of Formula II:

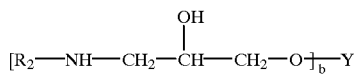

II where $R_2$ represents a hydrocarbon radical,

Y represents an organic group and b is an integer with a value in the range of 1 to 10 wherein greater than 0 to about 70 weight percent of the amine compound comprises Formula II; and blending with said amine component from about 5 to about 50 weight percent of the coating system of with an isocyanate component.

6. A method for applying a polymeric coating to a substrate, said method comprising:

forming a polymeric coating composition comprising:

an isocyanate component; and, an amine component comprising:

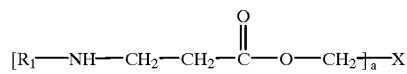

I where $R_1$ represents a hydrocarbon radical;

X represents an organic group; and a is an integer from 1 to 20 and:

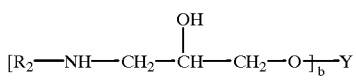

II where $R_2$ represents a hydrocarbon radical,

Y represents an organic group and b is an integer with a value in the range of 1 to 10, wherein greater than 0 to about 70 weight percent of the amine component comprises Formula II;

and applying the polymeric coating composition to a substrate.

7. The method according to claim 6 wherein the isocyanate component is selected from the group consisting of monomeric isocyanates, isocyanate functional prepolymers, and isocyanate functional adducts.

8. The method according to claim 6 wherein the isocyanate component is an isocyanurate of 1,6 hexamethylene disocyanate.

9. The method according to claim 6 wherein the isocyanate has an NCO content of from about 10 weight percent to about 35 weight percent.

10. The method according to claim 6 wherein the polymeric coating composition further comprises a pigment.

11. The method according to claim 6 further comprising the step of dropping glass beads onto the polymeric coating after the step of applying the polymeric coating composition.

* * * * *